United States Patent
Hoffmann et al.

(10) Patent No.: US 10,427,516 B2
(45) Date of Patent: Oct. 1, 2019

(54) DRIVE DEVICE FOR A MOTOR VEHICLE AND METHOD FOR OPERATING A DRIVE DEVICE

(71) Applicant: AUDI AG, Ingolstadt (DE)

(72) Inventors: Thomas Hoffmann, Riedenburg (DE); Karl Jägle, Ingolstadt (DE); Markus Störmer, Berching (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 15/728,837

(22) Filed: Oct. 10, 2017

(65) Prior Publication Data
US 2018/0099553 A1     Apr. 12, 2018

(30) Foreign Application Priority Data
Oct. 10, 2016   (DE) .......................... 10 2016 219 618

(51) Int. Cl.
| | | |
|---|---|---|
| *B60K 6/445* | (2007.10) | |
| *B60K 6/44* | (2007.10) | |
| (Continued) | | |

(52) U.S. Cl.
CPC .............. *B60K 6/44* (2013.01); *B60K 1/02* (2013.01); *B60K 6/36* (2013.01); *B60K 6/365* (2013.01); *B60K 6/383* (2013.01); *B60K 6/387* (2013.01); *B60K 6/445* (2013.01); *B60K 6/48* (2013.01); *B60K 6/547* (2013.01); *B60K 17/02* (2013.01); *B60K 17/046* (2013.01); *B60K 17/06* (2013.01); *B60K 17/165* (2013.01); *B60K 25/02* (2013.01); *F16H 3/089* (2013.01); *F16H 3/724* (2013.01); *F16H 3/727* (2013.01); *F16H 3/728* (2013.01);
(Continued)

(58) Field of Classification Search
CPC .............. F16H 37/0826; F16H 37/084; F16H 2037/088; F16H 2037/0886; F16H 3/728; B60K 6/445; B60K 6/365; B60K 2006/4816
See application file for complete search history.

(56) References Cited

U.S. PATENT DOCUMENTS

| | | | | |
|---|---|---|---|---|
| 7,699,735 B2 * | 4/2010 | Conlon | .................. | B60K 6/365 475/5 |
| 9,108,505 B2 | 8/2015 | Supina | | |
| (Continued) | | | | |

FOREIGN PATENT DOCUMENTS

| | | |
|---|---|---|
| DE | 199 34 696 A1 | 5/2001 |
| DE | 10116989 A1 | 10/2002 |
| (Continued) | | |

*Primary Examiner* — Erin D Bishop
(74) *Attorney, Agent, or Firm* — Maier & Maier, PLLC (57) ABSTRACT

A drive device for a motor vehicle. A first drive assembly, a second drive assembly, and an epicyclic gear train, via which the first drive assembly and the second drive assembly can be coupled to each other and to a driven shaft of the drive device. The first drive assembly is coupled to a first transmission element, the second drive assembly is coupled to a second transmission element, and the driven shaft is coupled to a third transmission element of the epicyclic gear train. The epicyclic gear train has a locking clutch for coupling of the second transmission element and the third transmission element to each other and the first transmission element can be braked by means of a braking device.

2 Claims, 3 Drawing Sheets

(51) Int. Cl.

| | | |
|---|---|---|
| *F16H 37/08* | (2006.01) | |
| *B60K 6/365* | (2007.10) | |
| *B60K 6/48* | (2007.10) | |
| *F16H 3/089* | (2006.01) | |
| *F16H 3/72* | (2006.01) | |
| *F16H 37/06* | (2006.01) | |
| *B60K 6/36* | (2007.10) | |
| *B60K 6/383* | (2007.10) | |
| *B60K 6/387* | (2007.10) | |
| *B60K 6/547* | (2007.10) | |
| *B60K 25/02* | (2006.01) | |
| *B60K 1/02* | (2006.01) | |
| *B60K 17/02* | (2006.01) | |
| *B60K 17/04* | (2006.01) | |
| *B60K 17/06* | (2006.01) | |
| *B60K 17/16* | (2006.01) | |
| *F16H 37/04* | (2006.01) | |
| *B60K 6/38* | (2007.10) | |
| *B60K 7/00* | (2006.01) | |

(52) U.S. Cl.
CPC ......... *F16H 37/042* (2013.01); *F16H 37/065* (2013.01); *F16H 37/084* (2013.01); *B60K 2006/381* (2013.01); *B60K 2006/4816* (2013.01); *B60K 2007/0061* (2013.01); *B60K 2025/024* (2013.01); *B60Y 2200/92* (2013.01); *F16H 2037/0886* (2013.01); *F16H 2200/2005* (2013.01); *F16H 2200/2007* (2013.01); *F16H 2200/2033* (2013.01); *F16H 2200/2066* (2013.01); *F16H 2200/2082* (2013.01); *Y02T 10/6239* (2013.01); *Y10S 903/911* (2013.01)

(56) References Cited

U.S. PATENT DOCUMENTS

| | | |
|---|---|---|
| 9,156,346 B2 | 10/2015 | Choi et al. |
| 9,297,447 B2 | 3/2016 | Kim et al. |
| 2009/0156351 A1* | 6/2009 | Brouwer ................ B60K 6/445 475/221 |

FOREIGN PATENT DOCUMENTS

| | | |
|---|---|---|
| DE | 10 2006 037 577 A1 | 2/2008 |
| DE | 102013214950 A1 | 2/2015 |
| EP | 0 773 127 A2 | 5/1997 |
| EP | 2351661 A1 | 3/2011 |

\* cited by examiner

DRIVE DEVICE FOR A MOTOR VEHICLE AND METHOD FOR OPERATING A DRIVE DEVICE

FIELD

The invention relates to a drive device for a motor vehicle, comprising a first drive assembly designed as an internal combustion engine, a second drive assembly designed as an electric motor, and an epicyclic gear train, via which the first drive assembly and the second drive assembly can be coupled to each other and to a driven shaft of the drive device, wherein the first drive assembly is coupled to or can be coupled to a first transmission element, the second drive assembly is coupled to or can be coupled to a second transmission element, and the driven shaft is coupled to or can be coupled to a third transmission element of the epicyclic gear train, wherein the first transmission element can be braked by means of a braking device.

BACKGROUND OF THE INVENTION

The drive device serves for driving the motor vehicle and in this regard, therefore, for supplying a torque directed at driving the motor vehicle. The drive device supplies the torque, which may also be referred to as the drive torque, at the driven shaft of the drive device. For example, the driven shaft is operatively connected rigidly and/or permanently to a wheel axle of the motor vehicle or to at least one wheel of the motor vehicle that can be associated with the wheel axle. The operative connection between the driven shaft and the wheel axle or the wheel can be produced via a transmission, such as, for example, a differential transmission, in particular a center differential transmission, and/or an axle differential transmission.

The drive device has a plurality of drive assemblies, namely, at least the first drive assembly and the second drive assembly. The two drive assemblies can basically be designed in any way. For example, the drive assemblies are of different type, so that the drive device in this regard is designed as a hybrid drive device. In this case, the first drive assembly can exist, for example, in the form of an internal combustion engine and the second drive assembly can be designed as an electric motor.

Additionally, the drive device has the epicyclic gear train. Via said epicyclic gear train the first drive assembly, the second drive assembly, and the driven shaft are coupled to each other or at least can be coupled to each other. The first drive assembly, the second drive assembly, and the driven shaft are hereby linked or can be linked to different transmission elements of the epicyclic gear train. Conversely, one of the drive assemblies or the driven shaft is associated with each of the transmission elements. The first drive assembly is hereby coupled to or can be coupled to the first transmission element, the second drive assembly is coupled to or can be coupled to the second transmission element, and the driven shaft is coupled to or can be coupled to the third transmission element. For each of the cases, the coupling can hereby occur optionally rigidly and/or permanently, for example.

The epicyclic gear train may also be referred to as planetary gear train and is preferably designed as an epicyclic toothed gear train. Preferably, the first drive assembly and the second drive assembly are coupled to each other or can be coupled to each other exclusively via the epicyclic gear train. In addition, it is preferably provided that at least the second drive assembly is coupled to or can be coupled to the driven shaft only via the epicyclic gear train. Additionally or alternatively, this can also be provided for the first drive assembly.

Known from the published document DE 101 16 989 A1 is, for example, a starting element and torque converter for working machines with energy recovery, composed of an arrangement of one planetary gearbox or a plurality of planetary gearboxes, which is or are arranged between a mechanical drive device and a mechanical driven device. It is thereby provided that one of the individual shafts of the epicyclic gearbox or gearboxes can be braked or driven, regardless of the other constraints in the system, by an electric motor, which is connected to an electrical energy storage system, so that it is possible to match the torque and the speed or rpm between the drive device and the driven device.

SUMMARY OF THE INVENTION

The object of the invention is to propose a drive device for a motor vehicle that, in comparison to known drive devices, offers advantages and, in particular, is characterized by a high energy efficiency as well as a great flexibility.

It is hereby provided that the epicyclic gear train has a locking clutch for coupling the second transmission element and the third transmission element to each other.

Via the locking clutch, a rigid coupling of the second transmission element and the third transmission element to each other is possible. When the locking clutch is opened, the two transmission elements are decoupled from each other, whereas, when the locking clutch is closed, they are connected to each other rigidly, that is, in a rotationally fixed manner. By use of the locking clutch, it is possible in this regard to lock the epicyclic gear train. If the two transmission elements, that is, the second transmission element and the third transmission element, are coupled to each other by means of the locking clutch, then the epicyclic gear train operates in so-called locked revolution or direct drive, in which the transmission elements have the same speed. In particular, in locked revolution, all transmission elements of the epicyclic gear train, that is, the first transmission element, the second transmission element, and the third transmission element, have the same speed.

If the second transmission element and the third transmission element are locked with respect to each other by means of the locking clutch, then the driven shaft can be driven solely by means of the second drive assembly, in particular when the first drive assembly is decoupled from the epicyclic gear train. For decoupling of the first drive assembly and the epicyclic gear train, a shift clutch, for example, is provided between them and exists as a starting clutch, for example, in the scope of the drive device for the motor vehicle. When the shift clutch is opened, the epicyclic gear train is decoupled from the first drive assembly, in particular completely. In contrast, when the shift clutch is closed at least partially and, in particular, completely, an operative connection between the first drive assembly and the epicyclic gear train or the first transmission element is produced, preferably a rigid operative connection.

In the case of an opened shift clutch, it would initially be possible to drive the driven shaft by means of the second drive assembly only when the locking clutch is closed, that is, when the second transmission element and the third transmission element are coupled to each other or are mutually locked, because the torque supplied by the second drive assembly, which is applied at the second transmission element, is distributed from the epicyclic gear train to the first transmission element and to the third transmission element. Only a small part of the torque supplied by the second drive assembly in this regard is transmitted to the driven shaft.

For this reason, in addition to the locking clutch, the braking device is provided. By means of the latter, the first transmission element of the epicyclic gear train can be braked, preferably completely braked, and in this regard can be locked. The braking of the first transmission element is preferably provided with respect to a casing of the epicyclic gear train or of the drive device. If the first transmission element is braked by means of the braking device or even completely locked, then a larger part of the torque supplied by the second drive assembly or the entire torque is transmitted to the driven shaft.

By use of the braking device and the locking clutch, two different gear ratios between the second drive assembly and the driven shaft in this regard are created or—in the case that a change gear transmission is provided between the epicyclic gear train and the driven shaft—a doubling of the number of drive gears or gear ratios provided by the change gear transmission is provided. Accordingly, the combined provision of the locking clutch and the braking device makes possible an extremely flexible operation of the drive device, in particular a flexible driving of the driven shaft solely by means of the second drive assembly via the epicyclic gear train at different gear ratios.

Another embodiment of the invention provides that the braking device has a shift clutch, by means of which the first transmission element can be coupled to the first drive assembly, which can be operated for braking the first transmission element. For braking the first transmission element, in this regard, the latter is coupled to the first drive assembly, which is operated in such a way that it brakes the first transmission element. Preferably, the first drive assembly is at a standstill; that is, it has a speed of zero. As a result, the drag torque of the first drive assembly is initially available for braking the first transmission element.

Obviously, additionally or alternatively, it can be provided that the first drive assembly is locked mechanically, so that a rotational movement of the first drive assembly is prevented. The locking of the first drive assembly can occur, for example, by force fit, that is, friction fit, or else by form fit. In particular, a drive shaft of the first drive assembly, such as, for example, a crankshaft of the internal combustion engine, is hereby locked with respect to the engine casing or crankcase of the first drive assembly.

In the scope of another embodiment of the invention, it is provided that the braking device has a freewheel, which permits a rotational movement of the first transmission element in a first direction of rotation and prevents a rotational movement in a second direction of rotation opposite to the first direction of rotation. If the driven shaft is to be driven by means of the second drive assembly when the locking clutch is opened, then, in accordance with the above statements, a part of the torque is imposed on the first transmission element. The freewheel is then designed in such a way that it prevents any rotational movement of the first transmission element that is induced by this torque and is opposite in direction to a direction of rotation of the first drive assembly during a normal operation of the latter. The first direction of rotation thus corresponds to a normal operating direction of rotation of the first drive assembly during its operation, whereas the second direction of rotation is opposite to the first direction of rotation.

An advantageous embodiment of the invention provides that the braking device has a brake and/or a locking device.

The brake or the locking device can be present alternatively to the freewheel. However, it can also be provided that the braking device has a plurality of elements chosen from the freewheel, the brake, and the locking device; that is, for example, it has, besides the freewheel, the brake and/or the locking device. The brake makes possible a force-fit braking of the first transmission element, whereas the locking device locks the first transmission element in a form-fit manner. Preferably, the braking effect of the brake can be adjusted and, in particular, continually adjusted, so that, by use of the brake, a desired braking torque can be imposed on the first transmission element.

In the scope of a preferred embodiment of the invention, it is provided that the freewheel, the brake, and/or the locking device are coupled directly to the first transmission element or can be coupled to it via the shift clutch. In the first case, the freewheel, the brake, and/or the locking device are preferably coupled rigidly and/or permanently to the first transmission element. In the other case, it should be possible to produce the operative connection between, on the one hand, the freewheel, the brake, and/or the locking device and, on the other hand, the first transmission element via the shift clutch, so that the mentioned elements in this regard can be coupled to the first transmission element. The freewheel, the brake, or the locking device is coupled rigidly and/or permanently, for example, to the first drive assembly or to the drive shaft of the first drive assembly.

Another embodiment of the invention provides that the third transmission element is coupled to or can be coupled to the driven shaft via a change gear transmission. Reference to such an embodiment was already made above. The change gear transmission makes it possible to adjust a drive gear selected from a plurality of drive gears or a gear ratio selected from a plurality of gear ratios between the third transmission element and the driven shaft. By use of the change gear transmission, it is in this regard possible to adjust different gear ratios between the third transmission element and the driven shaft.

For example, the change gear transmission makes it possible to adjust a gear ratio selected from exactly two different gear ratios. Obviously, however, a greater number of gear ratios can also be created. Through the provision of the locking clutch as well as of the braking device, it is then possible to double the number of gear ratios that can be created by use of the change gear transmission.

An enhancement of the invention provides that another drive assembly can be coupled to the first drive assembly or to the driven shaft by means of another shift clutch, in particular with circumvention of the epicyclic gear train. The additional drive assembly can be designed, for example, as an electric motor. It should be possible to couple the additional drive assembly either to the first drive assembly or to the driven shaft via the additional shift clutch. The operative connection produced via the additional shift clutch between the additional drive assembly and the first drive assembly of the driven shaft preferably is not made through the epicyclic gear train.

It can also be provided that the additional drive assembly can be coupled to the first drive assembly by means of the additional shift clutch and is coupled permanently to the driven shaft via, for example, another epicyclic gear train. In this case, the first drive assembly can be coupled to the driven shaft either via the epicyclic gear train or via the additional epicyclic gear train or via both of them. It can likewise be provided that the additional drive assembly can be coupled, on the one hand, by means of the additional shift clutch, either to the first drive assembly or to the driven shaft and, on the other hand, to the respective other drive assembly, that is, to the driven shaft or to the first drive assembly, via a freewheel or overrunning clutch.

In another preferred embodiment of the invention, it can be provided that the additional drive assembly is coupled to or can be coupled to a secondary drive shaft of a secondary drive of the drive device. The secondary drive is preferably integrated into the drive device, so that it or at least one secondary assembly of the secondary drive can be operated in an especially energy-efficient manner, while, at the same time, the drive device can be used flexibly, in particular in numerous operating states of the motor vehicle.

In particular, it should be possible to create an interaction between the drive assemblies and the secondary drive. This means that the secondary drive or the secondary drive shaft of the secondary drive can be operated optionally by means of the first drive assembly, by means of the additional drive assembly and/or by means of kinetic energy of the motor vehicle. The latter possibility is realized or at least optionally can be realized by a linkage of the secondary drive or the secondary drive shaft, which is independent from the first drive assembly, to the driven shaft of the drive device.

Finally, it is possible in the scope of another preferred embodiment of the invention to provide that the additional drive assembly can be coupled to the first drive assembly by means of the additional shift clutch, wherein the additional drive assembly can be coupled to the driven shaft via another epicyclic gear train, wherein the first drive assembly can be coupled to the driven shaft via the additional drive assembly by means of the additional shift clutch, with circumvention of the epicyclic gear train, and wherein the secondary drive shaft of the secondary drive is coupled to the additional epicyclic gear train.

On the one hand, it can also be provided that the first drive assembly can be coupled to the driven shaft via the additional drive assembly by means of the additional shift clutch. For example, a driven shaft of the additional drive assembly can be coupled in a rotationally resistant manner to the driven shaft of the first drive assembly, so that, when the shift clutch is closed, the drive shafts of the first drive assembly and the additional drive assembly have essentially the same speed. Obviously, it can hereby be provided that, in the operative connection between the first drive assembly and the additional drive assembly, a vibration damping device, such as, for example, a dual mass flywheel or the like, is present. This is, in particular, the case when the first drive assembly exists in the form of the internal combustion engine.

More preferably, it is provided that the first drive assembly can be coupled to the driven shaft via the additional drive assembly and the additional epicyclic gear train by means of the additional shift clutch. For this purpose, for example, the additional epicyclic gear train or a transmission element of the additional epicyclic gear train is coupled rigidly and/or permanently to the additional drive assembly, which can be coupled, in turn, by means of the additional shift clutch to the first drive assembly.

On the other hand, it can be provided that the secondary drive shaft of the secondary drive is coupled to the additional epicyclic gear train. The secondary drive in this regard—in the first case—is operatively connected to at least one transmission element of the additional epicyclic gear train, in particular rigidly and/or permanently. This means that the secondary drive or the secondary drive shaft always has the same speed as the transmission element to which it is coupled. Preferably, the secondary drive shaft is coupled to the additional drive assembly via the additional epicyclic gear train, in particular permanently, or at least can be coupled to it. This means that, preferably, the secondary drive shaft can be operatively connected to the first drive assembly via the additional epicyclic gear train and the additional shift clutch.

Accordingly, the secondary drive shaft can be driven both by use of the first drive assembly and by use of the additional drive assembly. In addition, because the additional epicyclic gear train is coupled to or at least can be coupled to the driven shaft of the drive device, it is additionally possible to use the kinetic energy of the motor vehicle for driving the secondary drive shaft and consequently for driving at least one secondary assembly of the secondary drive.

Additionally, a method for operating a drive device for a motor vehicle, in particular a drive device according to the above statements, is described, wherein the drive device has a first drive assembly, a second drive assembly, and an epicyclic gear train, via which the first drive assembly and the second drive assembly can be coupled to each other and to a driven shaft of the drive device, wherein the first drive assembly is coupled to or can be coupled to a first transmission element, the second drive assembly is coupled to or can be coupled to a second transmission element, and the driven shaft is coupled to or can be coupled to a third transmission element of the epicyclic gear train. It is hereby provided that the second transmission element and the third transmission element can be coupled to each other by means of a locking clutch of the epicyclic gear train and the first transmission element can be braked by means of a braking device.

Reference has already been made to the advantages of such a procedure or such an embodiment of the drive device. Both the method and the drive device can be enhanced in accordance with the above statements, so that in this regard, reference is made to these statements.

In particular, in the case that the above-described embodiment or linkage of the secondary drive is implemented, it can be provided that a parking brake for the motor vehicle is created by the simultaneous production of operative connections of the first drive assembly to the driven shaft, on the one hand, via the epicyclic gear train and, on the other hand, via the additional epicyclic gear train. For this purpose, gear ratios that are different from one another exist in the different operative connections between the first drive assembly and the driven shaft, so that the driven shaft is locked.

BRIEF DESCRIPTION OF THE DRAWINGS

The invention will be explained in detail below on the basis of the exemplary embodiments illustrated in the drawing, without any limitation of the invention thereby occurring.

DETAILED DESCRIPTION

Figure 1:
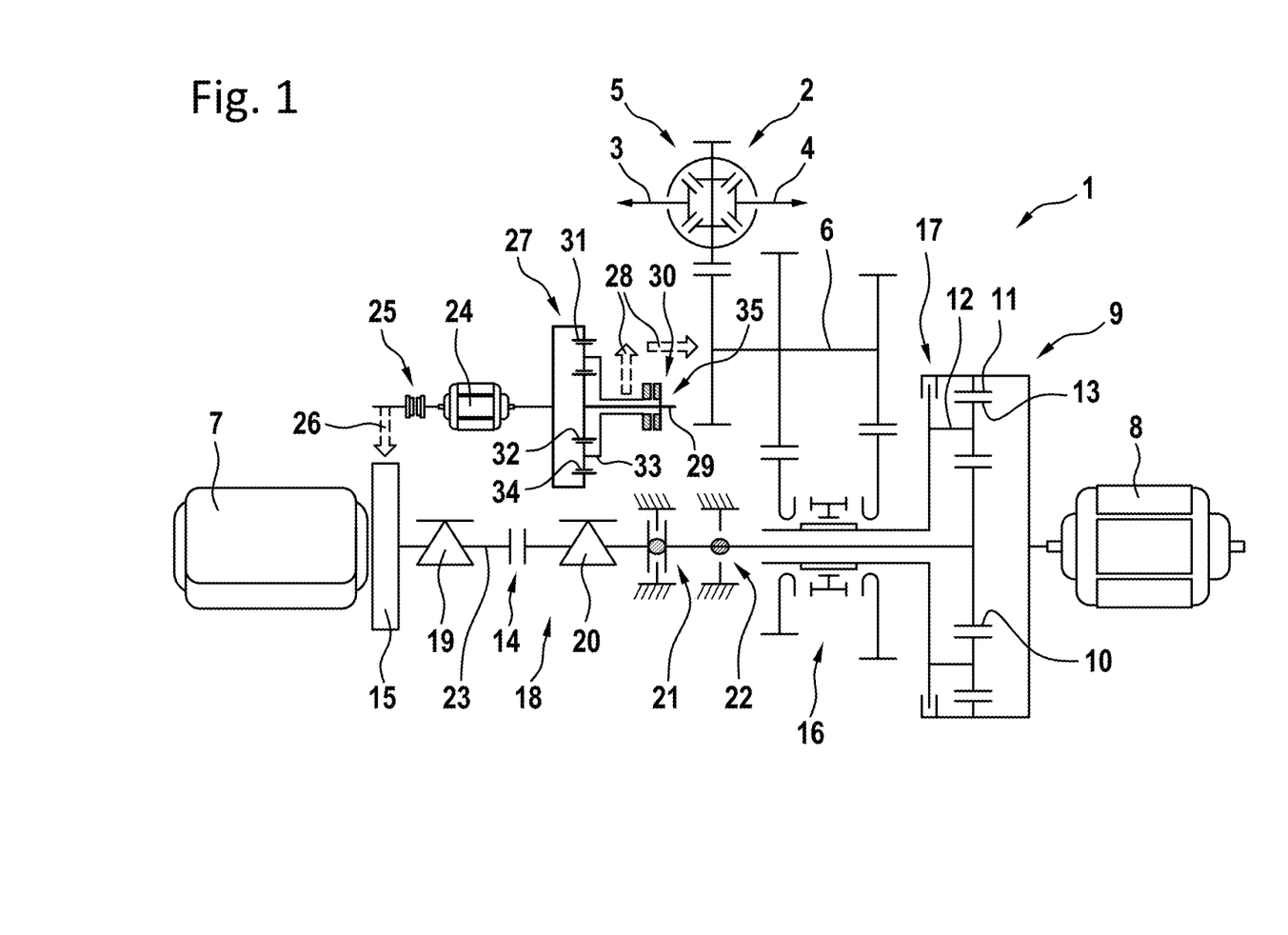
FIG. 1 shows a schematic illustration of a drive device for a motor vehicle.

FIG. 1 shows a schematic illustration of a drive device 1 for a motor vehicle, which is not illustrated here in more detail. The drive device 1 serves for driving a wheel axle 2 of the motor vehicle, which has two subaxles 3 and 4, which are operatively connected via a transmission 5, in particular an axle differential transmission, to a driven shaft 6 of the drive device 1. Each of the subaxles 3 and 4 is preferably associated with at least one wheel of the motor vehicle, which is not illustrated here, or is connected to it rigidly and/or permanently.

The drive device 1 has a first drive assembly 7 and a second drive assembly 8. The two drive assemblies 7 and 8 can be optionally coupled to each other via an epicyclic gear train 9. The epicyclic gear train 9 has a first transmission element 10, a second transmission element 11, and a third transmission element 12. Mounted rotatably at the third transmission element 12, which in this regard is designed as a planet gear cage, is at least one planet gear 13.

The first transmission element 10 and the second transmission element 11 are in operative connection to each other via the planet gear 13. For this purpose, preferably teeth of the planet gear 13 mesh with teeth of the first transmission element 10 and teeth of the second transmission element 11. In the exemplary embodiment illustrated here, the first transmission element 10 is designed as a sun gear and the second transmission element 11 is designed as a ring gear. It is also possible, however, to provide a reversed configuration.

The first drive assembly 7 can be coupled to the first transmission element 10, whereas the second drive assembly 8 is coupled to the second transmission element 11, in particular rigidly and/or permanently. Provided between the first drive assembly 7 and the first transmission element 10 is a shift clutch 14, wherein, in a first shifting position of the shift clutch 14, the first drive assembly 7 is decoupled from the first transmission element 10 and, in a second shifting position, is coupled to it, preferably likewise rigidly and/or permanently. A vibration damping device 15, which is designed as a dual mass flywheel, for example, can be associated with the first drive assembly 7.

The third transmission element 12 of the epicyclic gear train 9 is coupled to the driven shaft 6 via a change gear transmission 16. The driven shaft 6 is hereby present in the form of an output shaft of the change gear transmission 16 or is formed from it at least in regions. The change gear transmission 16 makes it possible to adjust at least two different gear ratios between the third transmission element 12 and the driven shaft 6.

The epicyclic gear train 9 has a locking clutch 17, by means of which the second transmission element 11 and the third transmission element 12 can be coupled to each other. In a first shifting position of the locking clutch 17, the first transmission element 11 and the second transmission element 12 are decoupled from each other or are operatively connected solely via the planet gear 13. In a second shifting position, in contrast, the transmission elements 11 and 12 are locked with respect to each other, in particular rigidly or in a rotationally resistant manner. When the locking clutch 17 is closed, it is also possible to drive the driven shaft 6 without anything further, when the shift clutch 14 is opened, solely by means of the second drive assembly 8 via the epicyclic gear train 9, but usually only with low torque.

In order to make driving possible also with a higher torque and/or when the shift clutch 14 is opened, a braking device 18 is provided, which is designed for braking the first transmission element 10, in particular for locking or blocking the first transmission element 10. The braking device 18 can comprise, for example, the shift clutch 14. If this is the case, then the first transmission element 10 can be braked by means of the first drive assembly 7, which is operated correspondingly.

However, the torque that can thereby be transmitted to the driven shaft 6 via the epicyclic gear train 9 depends on the first drive assembly 7, in particular on its drag torque. For this reason, it is preferably provided that the braking device 18 has a freewheel 19, a freewheel 20, a brake 21, and/or a locking device 22. Basically, one of these devices is sufficient, so that the braking device 18 thus has the freewheel 19 or the freewheel 20 or the brake 21 or the locking device 22. Obviously, it is also possible to provide a plurality of these devices or all of these devices. For example, one of the freewheels 19 or 20 is provided in combination with the brake 21 or the locking device 22.

The freewheel 19 permits a rotational movement of a drive shaft 23 of the first drive assembly 7 in a first direction of rotation and prevents it in a second direction of rotation that is opposite to the first direction of rotation. In contrast, the freewheel 20 permits a rotational movement of the first transmission element 10 in a first direction of rotation and prevents it in a second direction of rotation that is opposite to the first direction of rotation. By means of the freewheel 19, it is possible in this regard to brake or lock the first transmission element 10 only when the shift clutch 14 is closed, namely, in the second direction of rotation. In contrast, the freewheel 20 locks the first transmission element 10 in the second direction of rotation, regardless of the shifting position of the shift clutch 14.

The brake 21 makes it possible preferably to adjust a specific braking force or a specific braking torque that is imposed on the first transmission element 10. Preferably, it operates in a force-fit manner. In contrast, the locking device 22 preferably serves for form-fit locking of the first transmission element 10. By use of the braking device 18, the driven shaft 6 can also be driven solely by means of the second drive assembly 8 when the locking clutch 17 is opened, because the torque thereby acting on the first transmission element 10 is supported against the braking device 18. This means that, by use of the epicyclic gear train 9, a plurality of gear ratios can be adjusted between the second drive assembly 8 and the driven shaft 6 or the number of gear ratios that can be adjusted by means of the change gear transmission 16 can be doubled.

Additionally, the drive device 1 can have another drive assembly 24. Said drive assembly can be coupled by means of another shift clutch 25 to the first drive assembly 7. This is indicated by the arrow 26. The drive assembly 24 is coupled to or can be coupled to the driven shaft 6 via another epicyclic gear train 27. This is indicated by the arrows 28. Furthermore, the additional drive assembly 24 is coupled to or can be coupled to a secondary drive shaft 29 of a secondary drive 30 of the drive device 1.

The additional epicyclic gear train 27 has a first transmission element 31, a second transmission element 32, and a third transmission element 33. Mounted rotatably at the third transmission element 33 is at least one planet gear 34, via which the first transmission element 31 and the second transmission element 32 are coupled to each other. For this purpose, teeth of the planet gear 34 mesh both with teeth of the first transmission element 31 and with teeth of the second transmission element 32. The first transmission element 31 is present in this case in the form of a ring gear, the second transmission element 32 is present in the form of a sun gear, and the third transmission element 33 is present in the form of a planet gear cage.

The first transmission element 31 is preferably coupled rigidly to the additional drive assembly 24. The second transmission element 32 is coupled to the secondary drive shaft 29, preferably rigidly and/or permanently. The third transmission element 33 is coupled to the driven shaft 6, in particular rigidly and/or permanently, or can be coupled to it. It is possible for a locking clutch 35 to be associated with the additional epicyclic gear train 27, by means of which the second transmission element 32 and the third transmission element 33 can be locked with respect to each other. In a first shifting position of the locking clutch 35, the second transmission element 32 and the third transmission element 33 are consequently decoupled from each other and, in a second shifting position, they are coupled to each other, preferably rigidly.

More preferably, it is provided that, by means of the additional drive assembly 24, it is possible to regulate the speed of the secondary drive shaft 29. For this purpose, the additional drive assembly 24 is preferably decoupled from the first drive assembly 7 or the additional shift clutch 25 is opened, in particular completely opened. Additionally, the locking clutch 35 is opened, so that the transmission elements 32 and 33 are released with respect to each other, that is, not coupled to each other. For example, it is then provided that the secondary drive shaft 29 is coupled to the driven shaft 6 and accordingly—in the case that the motor vehicle is in motion—is driven using the kinetic energy of the motor vehicle. Obviously, however, the described procedure can also find use when the motor vehicle is at a standstill.

When the locking clutch 35 is opened, the speed of the secondary drive shaft 29 is adjusted depending on the speed of the driven shaft 6 and the speed of the additional drive assembly 24. Accordingly, it is provided that the speed of the additional drive assembly 24 is chosen and adjusted in such a way that the speed of the secondary drive shaft 29 corresponds to a target speed, regardless of the speed of the driven shaft 6. As a result of this, for example, the speed of the secondary drive shaft 29 can be kept constant or adjusted and, in particular, regulated to the target speed by means of the additional drive assembly 24, in particular also when the speed of the driven shaft 6 is changed.

When the driven shaft 6 is at a standstill, the entire power applied to the secondary drive shaft 29 is then supplied by means of the additional drive assembly 24. The higher the speed of the driven shaft 6, the higher is then the fraction of the power supplied by the driven shaft 6 and applied to the secondary drive shaft 29—given a constant speed of the secondary drive shaft 29. Conversely, the fraction supplied by the additional drive assembly 24 is, of course, smaller.

Additionally or alternatively, it can be provided that the driven shaft 6 is coupled to the first drive assembly 7 via the additional epicyclic gear train 27, in particular in a rotationally resistant manner. For this purpose, for example, the shift clutch 25 and the locking clutch 35 are closed, in particular completely closed. The shift clutch 14 is preferably opened in this case, even though the coupling of the driven shaft 6 to the first drive assembly 7 can be made via the additional epicyclic gear train 27, even when the shift clutch 14 is closed. The procedure can be provided independently from the braking of the first transmission element 10 by means of the braking device 18, in particular regardless of the presence of one freewheel or a plurality of freewheels 19 and 20.

In this way, it is possible, for example, to supply a thrust torque of the first drive assembly 7 at the driven shaft 6, in particular for braking of the driven shaft 6 and consequently of the motor vehicle. For example, this procedure can find application when the second drive assembly 8 cannot be operated for recuperation, in particular due to a full energy storage system. The energy storage system normally serves for intermediate storage of the electrical energy supplied by the second drive assembly 8 in recuperative mode. However, if the energy storage system is completely full or has a state of charge that is greater than a maximum state of charge, then the first drive assembly 7 is intended to be employed in the described way for braking of the driven shaft 6.

An embodiment of the drive device 1 or of the secondary drive 30 in the way described makes possible an extremely flexible and energy-efficient operation of the drive device 1. In addition, through the provision of the braking device 18, it is possible to create a relatively large number of gear ratios between the second drive assembly 8 and the driven shaft 6, even when the driven shaft 6 is driven via the epicyclic gear train 9 solely by means of the second drive assembly 8.

However, the embodiment with the secondary drive 30 illustrated here also makes possible an operation of the drive device 1, in which the driven shaft 6 is driven by means of the second drive assembly 8 via the epicyclic gear train 9 when the shift clutch 14 is opened, wherein, through appropriate adjustment of the locking clutch 17, one of a plurality of gear ratios is adjusted between the second drive assembly 8 and the driven shaft 6.

In addition, it can be provided that the driven shaft 6 is driven by means of the first drive assembly 7, namely, via the additional epicyclic gear train 27. For this purpose, the shift clutch 14 is opened and the additional shift clutch 25 is closed. Through appropriate adjustment of the locking clutch 35, it is also possible in this case to adjust one of a plurality of gear ratios between the first drive assembly 7 and the driven shaft 6.

Figure 2A:
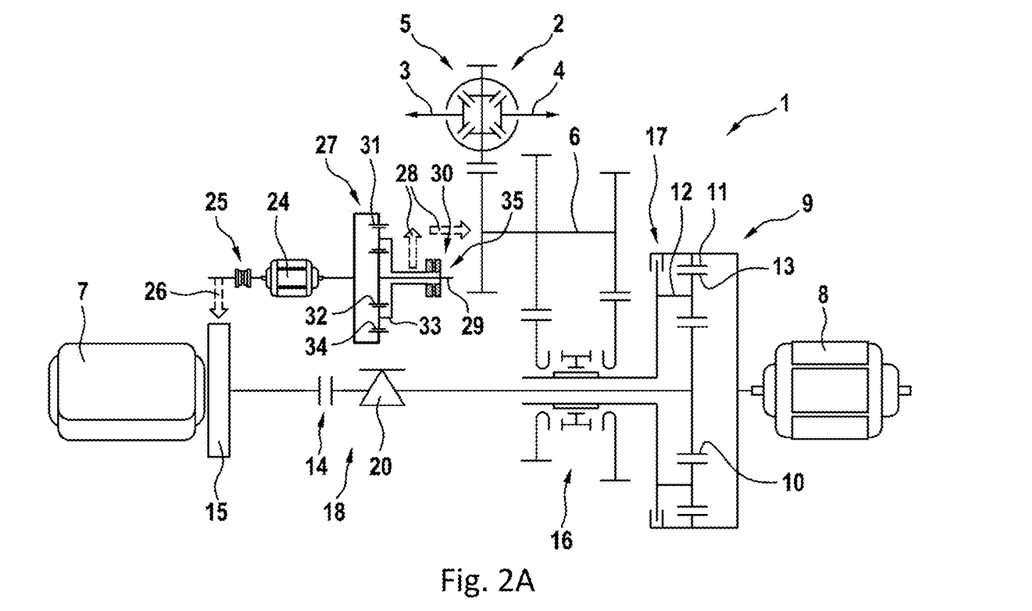
FIG. 2A shows a schematic illustration of a drive device for a motor vehicle.
Figure 2B:
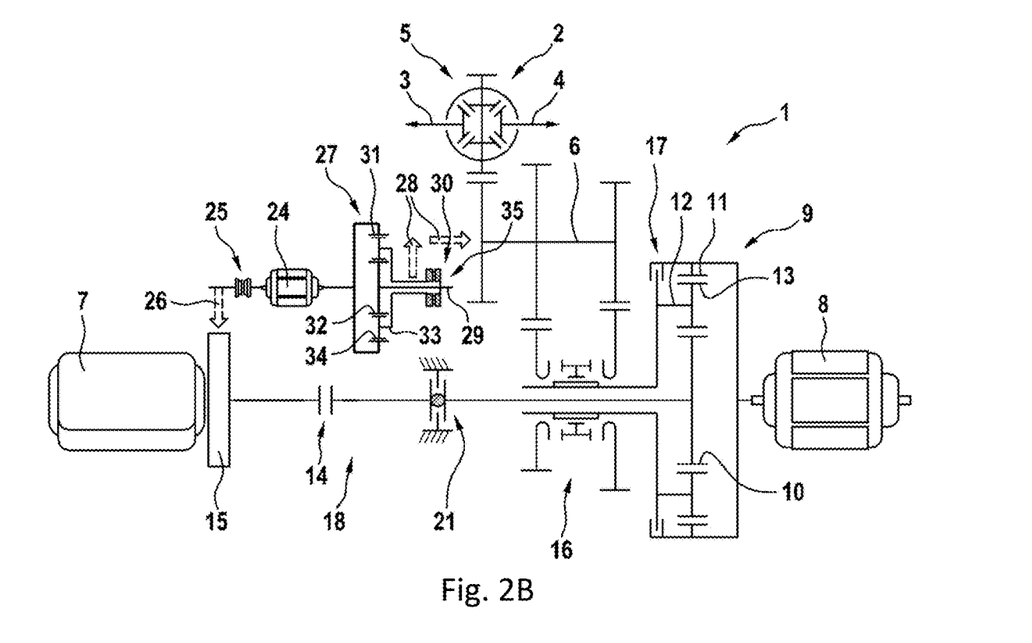
FIG. 2B shows a schematic illustration of a drive device for a motor vehicle.
Figure 2C:
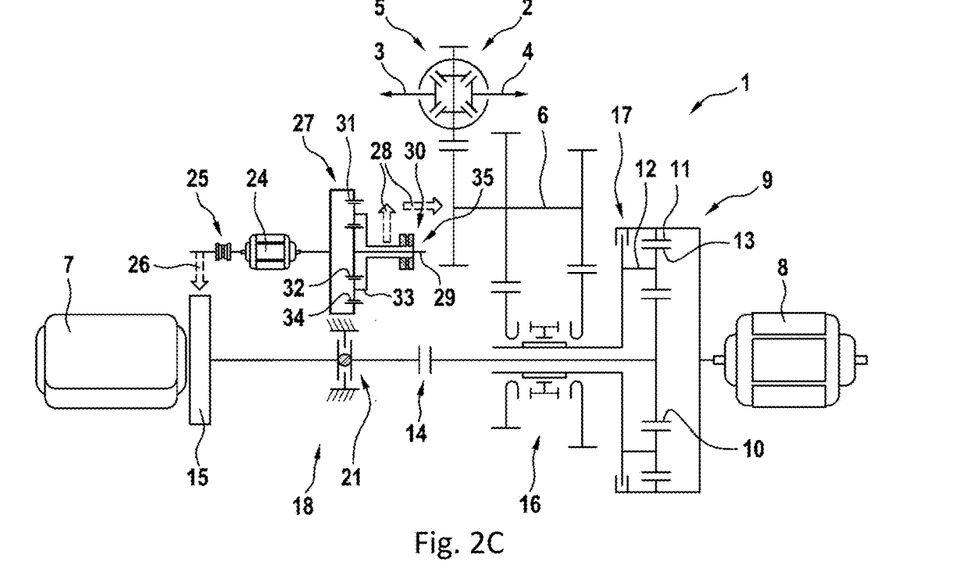
FIG. 2C shows a schematic illustration of a drive device for a motor vehicle.
Figure 2D:
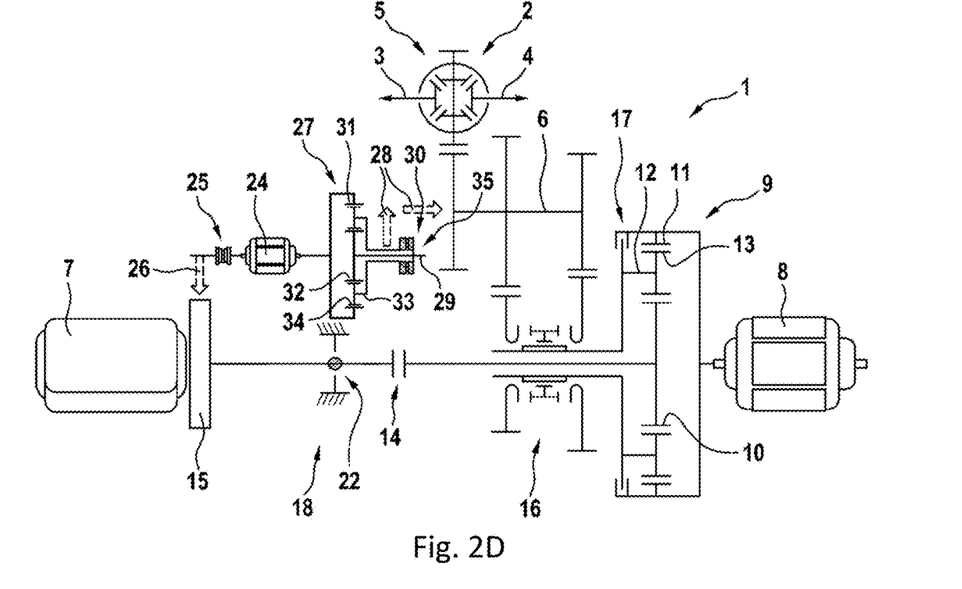
FIG. 2D shows a schematic illustration of a drive device for a motor vehicle.

Turning now briefly to FIGS. 2A, 2B, 2C, and 2D, these Figures show exemplary variations of the drive device 1, as discussed previously. In particular, FIG. 2A shows an exemplary embodiment in which the freewheel 20 is coupled directly to the first transmission element 16, FIG. 2B shows an exemplary embodiment in which the brake 21 is coupled directly to the first transmission element 16, FIG. 2C shows an exemplary embodiment in which the brake 21 is coupled to the first transmission element 16 via the shift clutch 14, and FIG. 2D shows an exemplary embodiment in which the locking device 22 is coupled to the first transmission element 16 via the shift clutch 14.

The invention claimed is:

1. A drive device for a motor vehicle, comprising:
a first drive assembly, which is an internal combustion engine, a second drive assembly, which is an electric motor, a first epicyclic gear train having a first transmission element, a second transmission element, and a third transmission element, and a driven shaft of the drive device, wherein the first drive assembly is coupled to the first transmission element, the second drive assembly is coupled to the second transmission element, and the driven shaft is coupled to the third transmission element via a change gear transmission having a single input from the first epicyclic gear train and a single output at the driven shaft, wherein the first transmission element is configured to be braked by a braking device, wherein the first epicyclic gear train has a locking clutch for coupling of the second transmission element and the third transmission element to each other, and wherein the braking device has a freewheel that permits a rotational movement of the first transmission element in a first direction of rotation and prevents it in a second direction of rotation that is opposite to the first direction of rotation.

2. The drive device according to claim 1, wherein the freewheel is directly coupled to the first transmission element or is coupled to it via a shift clutch.

\* \* \* \* \*